United States Patent
Kirkhope

(10) Patent No.: US 10,081,983 B2
(45) Date of Patent: Sep. 25, 2018

(54) APPARATUS WITH A ROTARY SEAL ASSEMBLY AXIALLY COINCIDENT WITH A SHAFT TILTING FOCAL POINT

(71) Applicant: Halliburton Energy Services, Inc., Houston, TX (US)

(72) Inventor: Kennedy J. Kirkhope, Nisku (CA)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/888,207

(22) PCT Filed: Mar. 21, 2014

(86) PCT No.: PCT/CA2014/000281
§ 371 (c)(1),
(2) Date: Oct. 30, 2015

(87) PCT Pub. No.: WO2015/139108
PCT Pub. Date: Sep. 24, 2015

(65) Prior Publication Data
US 2016/0069137 A1 Mar. 10, 2016

(51) Int. Cl.
*E21B 7/08* (2006.01)
*E21B 4/00* (2006.01)
(Continued)

(52) U.S. Cl.
CPC ............... *E21B 4/003* (2013.01); *E21B 7/06* (2013.01); *E21B 7/062* (2013.01); *F16C 19/30* (2013.01);
(Continued)

(58) Field of Classification Search
CPC ........................................................ E21B 7/06
(Continued)

(56) References Cited

U.S. PATENT DOCUMENTS 2,119,244 A * 5/1938 Pranger ................... E21B 33/08
277/329
2,890,859 A * 6/1959 Garrison ................... E21B 4/02
137/504
(Continued)

FOREIGN PATENT DOCUMENTS

CA 2474232 1/2001
WO 9630616 10/1996

OTHER PUBLICATIONS

Kalsi Engineering, Inc., Chapter D7—Extrusion gap considerations, Kalsi Seals Handbook, Revision 1, dated Apr. 4, 2013, pp. 1-17.
(Continued)

*Primary Examiner* — D. Andrews
(74) *Attorney, Agent, or Firm* — Terrence N. Kuharchuk; Parlee McLaws LLP; Clive D. Menezes

(57) ABSTRACT

An apparatus including a housing, a shaft rotatably extending through the housing, and a rotary seal assembly contained within the housing for providing a seal between the housing and the shaft. The shaft is capable of an amount of tilting within the housing about a tilting focal point which is axially located along the housing at an axial focal point position. The rotary seal assembly is axially located along the housing at an axial rotary seal position. The axial rotary seal position is substantially axially coincident with the axial focal point position.

15 Claims, 3 Drawing Sheets

(51) Int. Cl.
  *E21B 7/06* (2006.01)
  *F16C 33/76* (2006.01)
  *F16C 19/30* (2006.01)
  *F16C 23/08* (2006.01)

(52) U.S. Cl.
  CPC .............. *F16C 23/08* (2013.01); *F16C 33/76* (2013.01); *F16C 2352/00* (2013.01)

(58) Field of Classification Search
  USPC ............. 384/92, 619, 620; 464/178; 74/18.1
  See application file for complete search history.

(56) References Cited

U.S. PATENT DOCUMENTS

| | | | |
|---|---|---|---|
| 3,087,341 A * | 4/1963 | Hults | .................... H01H 23/06 |
| | | | 137/636 |
| 4,811,798 A | 3/1989 | Falgout, Sr. et al. | |
| 5,026,077 A | 6/1991 | Warner | |
| 5,875,859 A | 3/1999 | Ikeda et al. | |
| 6,092,610 A | 7/2000 | Kosmala et al. | |
| 6,244,361 B1 | 6/2001 | Comeau et al. | |
| 6,340,063 B1 | 1/2002 | Comeau et al. | |
| 6,769,499 B2 | 8/2004 | Cargill et al. | |
| 2002/0185314 A1* | 12/2002 | Cargill | .................... E21B 7/062 |
| | | | 175/57 |
| 2003/0235354 A1 | 12/2003 | Orlowski et al. | |

OTHER PUBLICATIONS

Kalsi Engineering, Inc., Chapter D10—Barrier seals, Kalsi Seals Handbook, Revision 1, dated Apr. 3, 2013, pp. 1-27.

* cited by examiner

APPARATUS WITH A ROTARY SEAL ASSEMBLY AXIALLY COINCIDENT WITH A SHAFT TILTING FOCAL POINT

TECHNICAL FIELD

An apparatus comprising a housing, a shaft rotatably extending through the housing, and a rotary seal assembly.

BACKGROUND OF THE INVENTION

An apparatus comprising a shaft rotatably extending through a housing may include one or more bearing assemblies and one or more rotary seal assemblies. The bearing assemblies may support the shaft within the housing and/or transfer forces between the housing and the shaft. The rotary seal assemblies may inhibit fluids and/or debris from transferring between an internal side of the housing and an external side of the housing.

In some such apparatus, the shaft may be capable of an amount of radial deflection within the housing and/or an amount of tilting within the housing. Tilting of the shaft within the housing may be accompanied by a bending and/or an articulation of the shaft within the housing. Tilting of the shaft within the housing may be caused intentionally for the functioning of the apparatus, and/or may be the result of forces acting on the shaft during use of the apparatus.

BRIEF DESCRIPTION OF DRAWINGS

Embodiments will now be described with reference to the accompanying drawings, in which.

DETAILED DESCRIPTION

Figure 1:
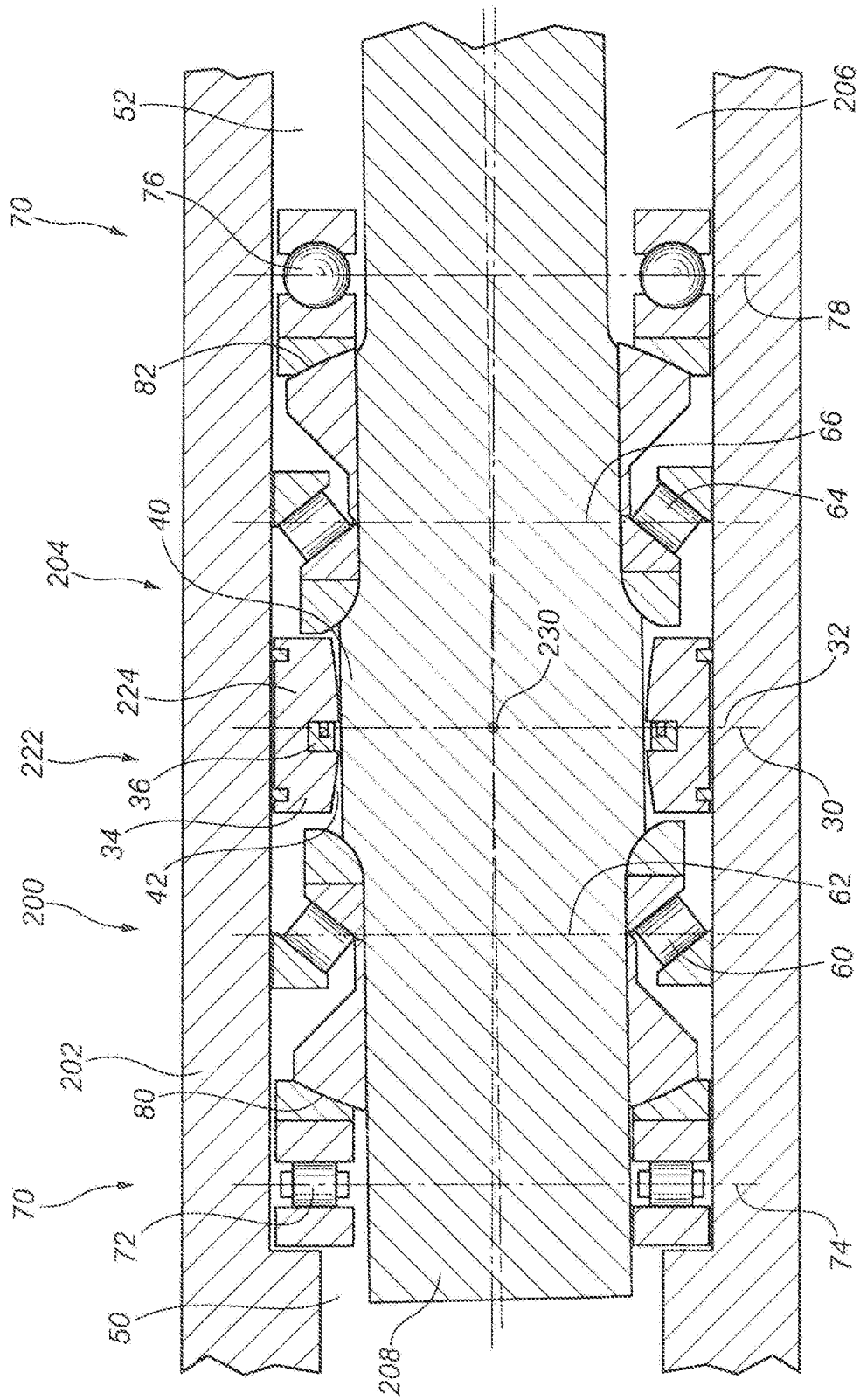
FIG. 1 is a partial longitudinal section assembly view of a first exemplary embodiment of an apparatus, comprising a double row focal bearing assembly.

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at an apparatus which comprises a housing, a shaft rotatably extending through the housing, and a rotary seal assembly contained within the housing for providing a seal between the housing and the shaft, wherein the rotary seal assembly is substantially axially coincident with a tilting focal point of the shaft within the housing. The apparatus may be any such apparatus, and the apparatus may be used for any purpose.

In some embodiments, the apparatus may be configured to be contained within a borehole. In such embodiments, the apparatus may be configured to be lowered within a borehole in any suitable manner including, as non-limiting examples, connected with a pipe string, with a coiled tubing string, with a wireline, or with a slickline. In some embodiments, the apparatus may be an apparatus for use in drilling a borehole. In some embodiments, the apparatus may be a drilling motor. In some embodiments, the apparatus may be a rotary steerable drilling apparatus. In some particular embodiments, the apparatus may be a "point-the-bit" type of rotary steerable drilling apparatus.

In the description which follows, the relative positions of components of the apparatus may be described with reference to the housing. More particularly, in the description which follows, the relative positions of components of the apparatus may be described "axially" with reference to the housing. As used herein, "axially located along the housing" means an axial position relative to and/or along the longitudinal axis of the housing.

As used herein, "tilting focal point" means a center of longitudinal rotation or longitudinal pivoting (i.e., "tilting") of the shaft about an axis which is perpendicular to a longitudinal axis of the shaft and/or a longitudinal axis of the housing. Tilting of the shaft within the housing may be caused in any manner including, as non-limiting examples, by radial deflection of a portion of the shaft within the housing at a location which is spaced from the tilting focal point and/or by the application of a bending moment or torque to the shaft. Tilting of the shaft within the housing may result in a misalignment of all or a portion of the shaft within the housing.

The tilting focal point is axially located along the housing at an axial focal point position.

The housing may be comprised of any structure which is capable of accommodating a shaft which is rotatable relative to the housing. In some embodiments, the housing may be comprised of a single piece or component. In some embodiments, the housing may be comprised of a plurality of pieces and/or components which may be connected together in any suitable manner.

The housing may define a housing bore so that the shaft rotatably extends through the housing bore in order to extend through the housing. In some embodiments, the housing bore may extend longitudinally through the housing along an axis which is substantially parallel to the longitudinal axis of the housing. In such embodiments, the apparatus may be configured so that the shaft is capable of an amount of tilting within the housing bore about the tilting focal point. In some such embodiments, the apparatus may also be configured so that the shaft is capable of an amount of radial deflection within the housing bore, in order to cause the tilting of the shaft within the housing and/or as a consequence of the tilting of the shaft within the housing.

In some embodiments, the apparatus may be configured so that the shaft extends fully through the housing. In some embodiments, the apparatus may be configured so that the shaft extends only partially through the housing.

The shaft may be comprised of any structure which is capable of rotatably extending through the housing. In some embodiments, the shaft may be comprised of a single piece or component. In some embodiments, the shaft may be comprised of a plurality of pieces and/or components which may be connected together in any suitable manner. In some embodiments, the shaft may define a shaft bore. In such embodiments, the shaft bore may extend fully through the shaft or the shaft bore may extend only partially through the shaft.

The rotary seal assembly may be comprised of any rotary seal or combination of rotary seals which is suitable for providing a seal between the housing and the shaft. The rotary seal assembly may be comprised of one or more contact seals, one or more non-contact seals, or a combination of contact seals and non-contact seals. In some embodiments, as non-limiting examples, the rotary seal assembly may be comprised of one or more lip-type contact seals and/or one or more Kalsi™ type seals.

In some embodiments, the housing may be comprised of an internal side and an external side. In some embodiments, the internal side and the external side of the housing may be separated by the rotary seal assembly. In some embodiments, the internal side of the housing may contain a lubricating fluid including, as a non-limiting example, a lubricating oil. In some embodiments, the external side of the housing may be exposed to the environment in which the apparatus is located including, as a non-limiting example, a wellbore environment.

The rotary seal assembly may exhibit an extrusion gap (i.e., clearance) between the rotary seal assembly and the shaft. In some embodiments, the extrusion gap may be configured to be relatively large in comparison with a conventional extrusion gap in order to accommodate the tilting of the shaft about the tilting focal point.

In some embodiments, the extrusion gap may be configured to be contoured in order to accommodate the tilting of the shaft about the tilting focal point. In some embodiments, the extrusion gap may be contoured by shaping the shaft and/or the rotary seal assembly. In some embodiments, the contour of the extrusion gap may provide a relatively larger extrusion gap at the axial ends of the rotary seal assembly and a relatively smaller extrusion gap toward the axial center of the rotary seal assembly. In some embodiments, the contour of the extrusion gap may be arc-shaped.

The rotary seal assembly is axially located along the housing at an axial rotary seal position. The axial rotary seal position is a nominal axial location along the housing at which the rotary seal assembly provides the seal between the housing and the shaft. In circumstances in which the seal is provided at more than a single point or continuously along an axial sealing length of the housing, the axial rotary seal position may be at any point along the sealing length. In some embodiments, the axial rotary seal position may be the center of the sealing length. In some embodiments, the axial rotary seal position may be a location of a particular rotary seal (such as a primary rotary seal) in the rotary seal assembly along the sealing length. In some embodiments, the axial rotary seal position may be a particular location along the sealing length.

The greater the axial distance along the housing between the axial focal point position and the axial rotary seal position, the greater the amount of radial deflection that the shaft may be subjected to as the shaft tilts within the housing. Ideally, but not essentially, the rotary seal assembly and the seals included in the rotary seal assembly are subjected to very little or no radial deflection of the shaft relative to the housing as the shaft tilts within the housing. As a result, the axial rotary seal position is substantially axially coincident with the axial focal point position, in order to minimize the amount of radial deflection of the shaft relative to the housing that the rotary seal assembly is required to accommodate as the shaft tilts within the housing.

In some embodiments, the apparatus may be comprised of a fulcrum between the housing and the shaft at the axial focal point position. In some embodiments, the rotary seal assembly may be substantially axially coincident with the fulcrum. In some embodiments, the fulcrum may be comprised of a protrusion on the housing which extends within the housing bore and/or a protrusion on the shaft which extends within the housing bore. In some embodiments in which the fulcrum may be comprised of a protrusion on the shaft, the extrusion gap may be defined between the rotary seal assembly and the fulcrum.

The shaft tilts within the housing about the tilting focal point. In some embodiments, the apparatus may be comprised of a tilting mechanism, and the tilting focal point may be provided by the tilting mechanism.

In some embodiments, the tilting mechanism may be associated with the housing and/or the shaft. The tilting mechanism may be associated with the housing and/or the shaft in any manner which enables the shaft to tilt within the housing about the tilting focal point. In some embodiments, the tilting mechanism may be contained within the housing. In such embodiments, the tilting mechanism may be radially interposed between the housing and the shaft.

The tilting mechanism may be comprised of any structure, device or apparatus which is capable of accommodating the tilting of the shaft within the housing about the tilting focal point.

In some embodiments, the tilting mechanism may be comprised of a focal bearing assembly which provides a bearing function while accommodating the tilting of the shaft within the housing about the tilting focal point. In some embodiments, the focal bearing assembly may be contained within the housing bore.

The focal bearing assembly may be comprised of one bearing or more than one bearing. The one or more bearings may be comprised of any suitable type of bearing or any suitable combination of suitable types of bearings. In some embodiments, the focal bearing assembly may be comprised of one or more plain bearings as a plain bearing assembly. In some embodiments, the focal bearing assembly may be comprised of one or more rolling element bearings as a rolling element bearing assembly including, as non-limiting examples, one or more spherical roller bearings as a spherical roller bearing assembly, or one or more tapered roller bearings as a tapered roller bearing assembly. In some embodiments, the focal bearing assembly may be comprised of a combination of plain bearings and rolling element bearings.

In some embodiments, the focal bearing assembly may be comprised of a double row focal bearing assembly. In such embodiments, the double row focal bearing assembly may be comprised of a first focal bearing row which is axially located along the housing at an axial first row position and a second focal bearing row which is axially located along the housing at an axial second row position. In such embodiments, the axial focal point position may be between the axial first row position and the axial second row position so that the axial rotary seal position is between the axial first row position and the axial second row position.

In some embodiments, the axial first row position may be on the internal side of the housing and the axial second row position may be on the external side of the housing. In some such embodiments, the first focal bearing row may be in contact with a lubricating fluid contained within the internal side of the housing. In some such embodiments, the second focal bearing row may be exposed to the environment in which the apparatus is located.

In some embodiments, the focal bearing assembly may be comprised of a single row focal bearing assembly. In such embodiments, the single row focal bearing assembly may be comprised of a single focal bearing row which is axially located along the housing at an axial single row position. In such embodiments, the axial focal point position may be offset from the axial single row position so that the axial rotary seal position is offset from the axial single row position.

In some embodiments, the axial single row position may be on the external side of the housing. In some embodiments, the axial single row position may be on the internal side of the housing. In some embodiments in which the axial single row position is on the internal side of the housing, the single focal bearing row may be in contact with a lubricating fluid contained within the internal side of the housing.

In some embodiments, the apparatus may be comprised of a thrust bearing assembly, for supporting the shaft within the housing and/or for transferring axial loads between the housing and the shaft. In some embodiments, the thrust bearing assembly may be fully or partially contained within the housing and/or within the housing bore.

The thrust bearing assembly may be comprised of one thrust bearing or more than one thrust bearing. The one or more thrust bearings may be comprised of any suitable type of bearing or any suitable combination of suitable types of bearings. In some embodiments, the thrust bearing assembly may be comprised of one or more plain bearings as a plain thrust bearing assembly. In some embodiments, the thrust bearing assembly may be comprised of one or more rolling element bearings as a rolling element thrust bearing assembly. In some embodiments, the thrust bearing assembly may be comprised of a combination of plain bearings and rolling element bearings.

The thrust bearing assembly is axially located along the housing at an axial thrust bearing position. The axial thrust bearing position is a nominal axial location along the housing at which the thrust bearing assembly provides a thrust bearing function between the housing and the shaft. In circumstances in which the thrust bearing function is provided at more than a single point or continuously along an axial thrust bearing length of the housing, the axial thrust bearing position may be at any point along the thrust bearing length. In some embodiments, the axial thrust bearing position may be the center of the thrust bearing length. In some embodiments, the axial thrust bearing position may be a location of a particular thrust bearing in the thrust bearing assembly along the thrust bearing length. In some embodiments, the axial thrust bearing position may be a particular location along the thrust bearing length.

In some embodiments, the thrust bearing assembly may be configured to provide a thrust bearing function with respect to axial loads in both directions. In some embodiments, the thrust bearing assembly may be configured to provide a thrust bearing function with respect to axial loads in only one direction.

In some embodiments, the thrust bearing assembly may be comprised of a first thrust bearing assembly and a second thrust bearing assembly. The first thrust bearing assembly and the second thrust bearing assembly may each be comprised of one thrust bearing or more than one thrust bearing. The one or more thrust bearings may be comprised of any suitable type of bearing or any suitable combination of suitable types of bearings. In some embodiments, the first thrust bearing assembly and/or the second thrust bearing assembly may be comprised of one or more plain bearings as a plain thrust bearing assembly. In some embodiments, the first thrust bearing assembly and/or the second thrust bearing assembly may be comprised of one or more rolling element bearings as a rolling element thrust bearing assembly. In some embodiments, the first thrust bearing assembly and/or the second thrust bearing assembly may be comprised of a combination of plain bearings and rolling element bearings.

The first thrust bearing assembly is axially located along the housing at an axial first thrust bearing position. The axial first thrust bearing position is a nominal axial location along the housing at which the first thrust bearing assembly provides a thrust bearing function between the housing and the shaft. In circumstances in which the thrust bearing function is provided by the first thrust bearing assembly at more than a single point or continuously along an axial thrust bearing length of the housing, the axial first thrust bearing position may be at any point along the thrust bearing length. In some embodiments, the axial first thrust bearing position may be the center of the thrust bearing length. In some embodiments, the axial first thrust bearing position may be a location of a particular thrust bearing in the first thrust bearing assembly along the thrust bearing length. In some embodiments, the axial first thrust bearing position may be a particular location along the thrust bearing length.

The second thrust bearing assembly is axially located along the housing at an axial second thrust bearing position. The axial second thrust bearing position is a nominal axial location along the housing at which the second thrust bearing assembly provides a thrust bearing function between the housing and the shaft. In circumstances in which the thrust bearing function is provided by the second thrust bearing assembly at more than a single point or continuously along an axial thrust bearing length of the housing, the axial second thrust bearing position may be at any point along the thrust bearing length. In some embodiments, the axial thrust bearing position may be the center of the thrust bearing length. In some embodiments, the axial second thrust bearing position may be a location of a particular thrust bearing in the second thrust bearing assembly along the thrust bearing length. In some embodiments, the axial second thrust bearing position may be a particular location along the thrust bearing length.

In some embodiments, the axial first thrust bearing position and the axial second thrust bearing position may be adjacent to each other. In some embodiments, the axial first thrust bearing position and the axial second thrust bearing position may be axially separated from each other. In some particular embodiments, the axial focal bearing position and the axial rotary seal position may be between the axial first thrust bearing position and the axial second thrust bearing position.

In some embodiments, the first thrust bearing assembly and the second thrust bearing assembly may both be configured to provide a thrust bearing function with respect to axial loads in both directions. In some embodiments, the first thrust bearing assembly and the second thrust bearing assembly may both be configured to provide a thrust bearing function with respect to axial loads in only one direction. In some embodiments, the first thrust bearing assembly and the second thrust bearing assembly may be configured to provide a thrust bearing function with respect to axial loads in opposite directions.

The thrust bearing assembly may be arranged in any suitable configuration with respect to the rotary seal assembly and the focal bearing assembly. In some embodiments, the axial thrust bearing position may be on the external side of the housing. In some embodiments, the axial thrust bearing position may be on the internal side of the housing.

In embodiments in which the thrust bearing assembly is comprised of a first thrust bearing assembly and a second thrust bearing assembly, the axial first thrust bearing position may be on the external side of the housing or on the internal side of the housing, and the axial second thrust bearing position may be on the external side of the housing or on the internal side of the housing.

In some particular embodiments in which the focal bearing assembly is comprised of a first focal bearing row and a second focal bearing row, and in which the thrust bearing assembly is comprised of a first thrust bearing assembly and a second thrust bearing assembly, the axial first thrust bearing position may be on the internal side of the housing and the axial second thrust bearing position may be on the external side of the housing. In some such embodiments, the first thrust bearing assembly may be contained within the housing and/or within the housing bore and may be in contact with a lubricating fluid contained within the internal side of the housing.

In some particular embodiments in which the focal bearing assembly is comprised of a single focal bearing row, and in which the thrust bearing assembly is comprised of a single thrust bearing assembly, the axial thrust bearing position may be on the internal side of the housing. In some such embodiments, the thrust bearing assembly may be contained within the housing and/or within the housing bore and may be in contact with a lubricating fluid contained within the internal side of the housing.

In some embodiments, the thrust bearing assembly may be comprised of one or more thrust bearing tilting surfaces, to enable the thrust bearing assembly to accommodate the tilting of the shaft within the housing while providing the thrust bearing function. A thrust bearing tilting surface may be comprised of any suitable structure, device or apparatus including, as non-limiting examples, a plain bearing or a rolling element bearing which is configured to accommodate the tilting of the shaft relative to the housing.

Figure 2:
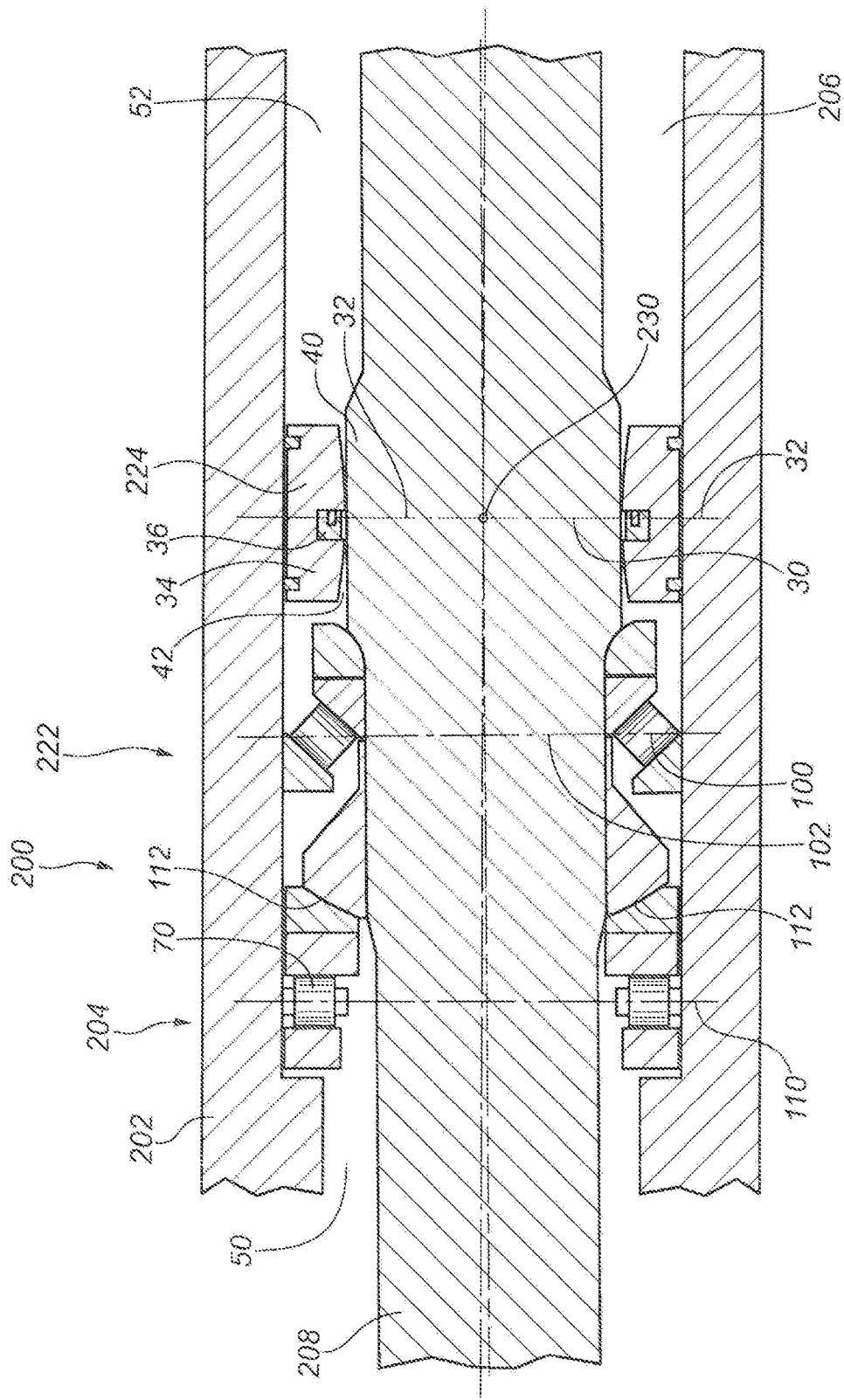
FIG. 2 is a partial longitudinal section assembly view of a second exemplary embodiment of an apparatus, comprising a single row focal bearing assembly.

FIG. 1 depicts a first exemplary embodiment, in which the apparatus may be a rotary steerable drilling apparatus. FIG. 2 depicts a second exemplary embodiment, in which the apparatus may also be a rotary steerable drilling apparatus.

Figure 3:
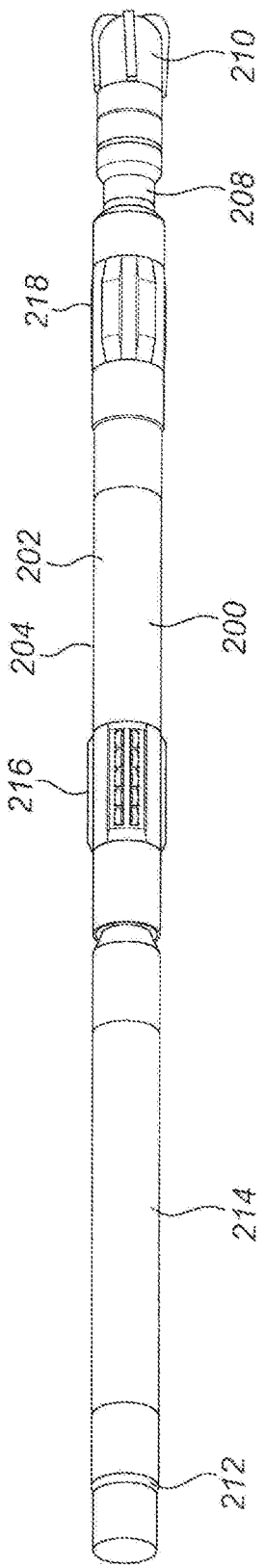
FIG. 3 is a pictorial view of an exemplary rotary steerable drilling apparatus which may incorporate features of the exemplary embodiments depicted in FIG. 1 and FIG. 2, shown connected with a drill string.
Figure 4:
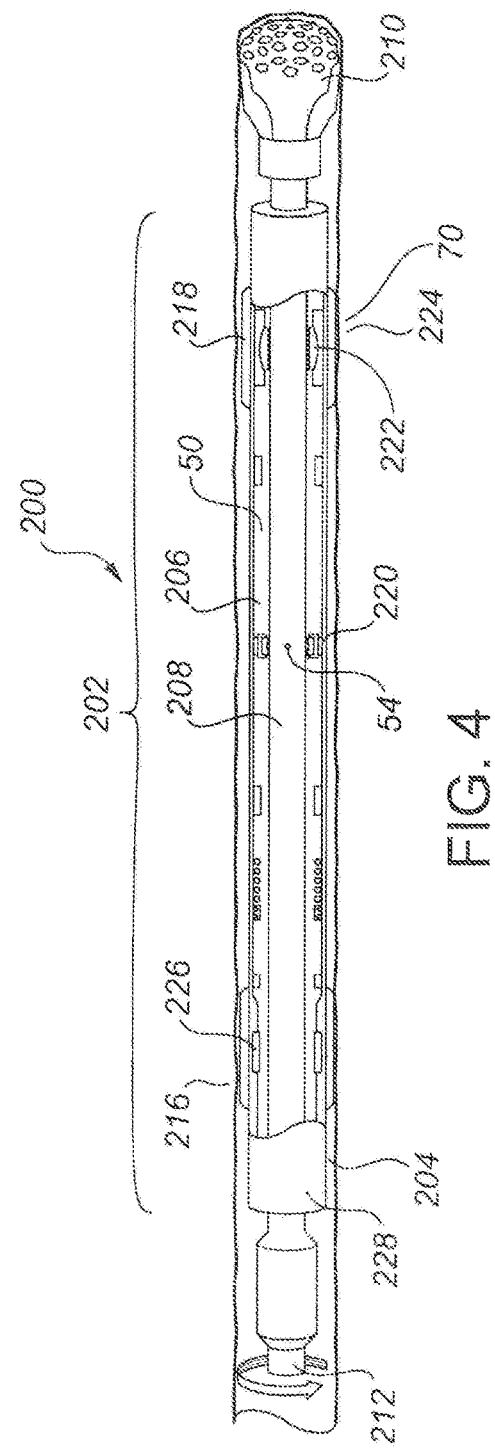
FIG. 4 is a schematic longitudinal section assembly view of the exemplary rotary steerable drilling apparatus depicted in FIG. 3, shown disconnected from the drill string.

FIGS. 3-4 depict an exemplary rotary steerable drilling apparatus which may incorporate features of the first exemplary embodiment, the second exemplary embodiment, or features of other embodiments of the apparatus described in this disclosure.

FIGS. 1-4 are exemplary only. The features of the apparatus described in this disclosure may be used in any suitable apparatus and at any suitable location in any suitable apparatus, and the features of the apparatus described in this disclosure may be provided in embodiments other than the first exemplary embodiment and the second exemplary embodiment.

In the description of the first exemplary embodiment and the second exemplary embodiment which follows, features which are identical or equivalent in the two exemplary embodiments will be identified with the same reference numbers.

Referring to FIGS. 3-4, an exemplary point-the-bit rotary steerable drilling apparatus (200) is depicted. As non-limiting examples, the exemplary point-the-bit rotary steerable drilling apparatus (200) may be a rotary steerable drilling apparatus of the type described in U.S. Pat. No. 6,244,361 (Comeau et al) and/or U.S. Pat. No. 6,769,499 (Cargill et al).

The exemplary point-the-bit rotary steerable drilling apparatus (200) is comprised of a housing (202) having an exterior (204) and a housing bore (206). A shaft (208) extends through the housing bore (206). The shaft (208) is rotatable relative to the housing (202).

In the exemplary point-the-bit rotary steerable apparatus (200), a drill bit (210) is connected with a distal end of the shaft (208), and a drill string (212) is connected with a proximal end of the shaft (208). The drill string (212) may include a drill string communication system (214) such as a measurement-while-drilling system.

In the exemplary point-the-bit rotary steerable drilling apparatus (200), an anti-rotation device (216) is connected with or integrated into the housing (202) adjacent to a proximal end of the housing (202), and a near-bit stabilizer (218) is connected with or integrated into the housing (202) adjacent to a distal end of the housing (202).

In the exemplary point-the-bit rotary steerable drilling apparatus (200), a deflection mechanism (220) is contained within the housing (202), which may be actuated to cause radial deflection of a portion of the shaft (208) within the housing bore (206).

In the exemplary point-the-bit rotary steerable drilling apparatus (200), a lower focal bearing assembly (222), a lower rotary seal assembly (224), an upper bearing assembly (226), and an upper rotary seal assembly (228) are located within the housing bore (206) to support the shaft (208) within the housing (202) and to provide seals between the housing (202) and the shaft (208).

The deflection mechanism (220) may be comprised of any structure, device or apparatus which is capable of causing the radial deflection of the portion of the shaft (208) within the housing bore (206). The radial deflection of the portion of the shaft (208) may result in bending of the shaft (208) within the housing bore (206). Additionally or alternatively, the radial deflection of the portion of the shaft (208) may result in articulation of the shaft (208) within the housing bore (206), if the shaft (208) is comprised of a joint (not shown) which facilitates such articulation.

In either case, the radial deflection of the portion of the shaft (208) by the deflection mechanism (220) causes tilting of the shaft (208) within the housing bore (206), thereby "pointing" the shaft (208) in a direction which is at an angle relative to the longitudinal axis of the housing (202).

In the exemplary rotary steerable drilling apparatus (200) depicted in FIGS. 3-4, the tilting of the shaft (208) is accommodated by the focal bearing assembly (222), which acts as a tilting mechanism for the shaft (208). As a result, the radial deflection of the shaft (208) by the deflection mechanism (220) causes the shaft (208) to tilt within the housing bore (206) about a tilting focal point (230), which represents the center of tilting of the shaft (208).

Referring to FIGS. 1-4, in the first exemplary embodiment and the second exemplary embodiment, the tilting focal point (230) is provided by the focal bearing assembly (222) as a tilting mechanism. In other apparatus, the tilting focal point (230) may be any real or imaginary point which represents the center of tilting of the shaft (208) within the housing bore (206).

The first exemplary embodiment of an apparatus is depicted in FIG. 1, for use in the exemplary rotary steerable drilling apparatus (200) of FIGS. 3-4, and is described in the context of FIGS. 3-4 without limiting the potential application and use of the first exemplary embodiment in other apparatus and/or in other configurations.

Referring to FIG. 1, the first exemplary embodiment may be incorporated within the rotary steerable drilling apparatus (200) of FIGS. 3-4, which comprises the housing (202), the shaft (208) rotatably extending through the housing bore (206), and the rotary seal assembly (224) contained within the housing bore (206) for providing a seal between the housing (202) and the shaft (208).

In the first exemplary embodiment, the shaft (208) is capable of an amount of radial deflection within the housing bore (206) and an amount of tilting within the housing bore (206) about the tilting focal point (230). The tilting focal point (230) is axially located along the housing (202) at an axial focal point position (30).

In the first exemplary embodiment, the rotary seal assembly (224) is contained within the housing bore (206) and is axially located along the housing (202) at an axial rotary seal position (32). The axial rotary seal position (32) is substantially axially coincident with the axial focal point position (30) in order to minimize the amount of radial deflection of the shaft (208) relative to the housing (202) which the rotary seal assembly (224) is subjected to as the shaft (208) tilts within the housing bore (206).

In the first exemplary embodiment, the rotary seal assembly (224) is comprised of a rotary seal carrier (34) and a single lip-type contact seal (36) which is mounted within the rotary seal carrier (34). In the exemplary embodiment, the axial rotary seal position (32) is defined by the location of the single contact seal (36). In other embodiments, other types of rotary seals and other numbers of rotary seals may be included in the rotary seal assembly (224), and the axial rotary seal position (32) may be defined in some other manner. The rotary seal carrier (34) is fixedly mounted to the housing (202) so that the rotary seal carrier (34) does not rotate relative to the housing (202).

In the first exemplary embodiment, the apparatus (200) is comprised of a fulcrum (40) between the housing (202) and the shaft (208) at the axial focal point position (30). In the exemplary embodiment, the fulcrum (40) is comprised of a protrusion on the shaft (208). The fulcrum (40) assists in defining the axial focal point position (30) and provides an interface between the rotary seal assembly (224) and the shaft (208).

In the first exemplary embodiment, the rotary seal assembly (224) exhibits an extrusion gap (42) between the rotary seal carrier (34) and the shaft (208). In the first exemplary embodiment, the extrusion gap (42) is contoured in order to accommodate the tilting of the shaft (208) about the tilting focal point (230). More particularly, in the first exemplary embodiment, the extrusion gap (42) is substantially arc-shaped and provides a relatively larger extrusion gap at the axial ends of the rotary seal assembly (224) and a relatively smaller extrusion gap toward the axial center of the rotary seal assembly (224).

In the first exemplary embodiment, the housing (202) has an internal side (50) and an external side (52), which are separated by the rotary seal assembly (224). In the first exemplary embodiment, a lubricating fluid (not shown) may be contained within the internal side (50) of the housing (202), and the external side (52) of the housing (202) may be exposed to the environment in which the apparatus (200) is located. In the first exemplary embodiment, the deflection mechanism (220) is axially located along the housing (202) at an axial deflection mechanism position (54), and the axial deflection mechanism position (54) is on the internal side (50) of the housing (202).

In the first exemplary embodiment, the focal bearing assembly (222) is a double row focal bearing assembly which comprises a first focal bearing row (60) axially located along the housing (202) at an axial first row position (62) and a second focal bearing row (64) axially located along the housing (202) at an axial second row position (66). In the first exemplary embodiment, the first focal bearing row (60) and the second focal bearing row (64) are comprised of a spherical roller bearing assembly or a tapered roller bearing assembly arranged in a convex configuration, so that the focal bearing assembly (222) is a roller bearing assembly.

In the first exemplary embodiment, the axial focal point position (30) and the axial rotary seal position (32) are axially located between the axial first row position (62) and the axial second row position (66). In the first exemplary embodiment, the axial first row position (62) is on the internal side (50) of the housing (202), and the axial second row position (66) is on the external side (52) of the housing (202).

In the first exemplary embodiment, the apparatus (200) is further comprised of a lower thrust bearing assembly (70) which is adjacent to the focal bearing assembly (222) and the rotary seal assembly (224). In the first exemplary embodiment, the thrust bearing assembly (70) is comprised of a first thrust bearing assembly (72) which is contained within the housing bore (206) and is axially located along the housing (202) at an axial first thrust bearing position (74), and a second thrust bearing assembly (76) which is contained within the housing bore (206) and is axially located along the housing (202) at an axial second thrust bearing position (78). In the first exemplary embodiment, the first thrust bearing assembly (72) and the second thrust bearing assembly (76) are rolling element bearing assemblies such as ball bearing assemblies or roller bearing assemblies.

In the first exemplary embodiment, the first thrust bearing assembly (72) and the second thrust bearing assembly (76) are configured to provide a thrust bearing function with respect to axial loads in opposite directions. In other embodiments, one or both of the first thrust bearing assembly (72) and the second thrust bearing assembly (76) may be configured to provide a thrust bearing function with respect to axial loads in both directions.

In the first exemplary embodiment, the axial first thrust bearing position (74) is on the internal side (50) of the housing (202) and the axial second thrust bearing position (78) is on the external side (52) of the housing (202). In the first exemplary embodiment, the first thrust bearing assembly (72) and the second thrust bearing assembly (76) are more particularly arranged so that the axial first row position (62) of the first focal bearing row (60) is axially located between the axial first thrust bearing position (74) of the first thrust bearing assembly (72) and the axial rotary seal position (32) of the rotary seal assembly (224), and so that the axial second row position (66) of the second focal bearing row (64) is axially located between the axial rotary seal position (32) of the rotary seal assembly (224) and the axial second thrust bearing position (78) of the second thrust bearing assembly (76).

In the first exemplary embodiment, the first thrust bearing assembly (72) is comprised of a pair of first thrust bearing tilting surfaces (80) to accommodate the tilting of the shaft (208) within the housing bore (206), and the second thrust bearing assembly (76) is comprised of a pair of second thrust bearing tilting surfaces (82) to accommodate the tilting of the shaft (208) within the housing bore (206). In the first exemplary embodiment, the thrust bearing tilting surfaces (80, 82) are comprised of plain bearing surfaces.

The second exemplary embodiment of an apparatus is depicted in FIG. 2, for use in the exemplary rotary steerable drilling apparatus (200) of FIGS. 3-4, and is described in the context of FIGS. 3-4 without limiting the potential application and use of the first exemplary embodiment in other apparatus and/or in other configurations.

Referring to FIG. 2, the second exemplary embodiment may be incorporated within the rotary steerable drilling apparatus (200) of FIGS. 3-4, which comprises the housing (202), the shaft (208) rotatably extending through the housing bore (206), and the rotary seal assembly (224) contained within the housing bore (206) for providing a seal between the housing (202) and the shaft (208).

The description of the second exemplary embodiment which follows is limited to the differences between the second exemplary embodiment and the first exemplary embodiment.

In the second exemplary embodiment, the focal bearing assembly (222) is a single row focal bearing assembly which comprises a single focal bearing row (100) axially located along the housing (202) at an axial single row position (102). In the second exemplary embodiment, the single focal bearing row (100) is comprised of a spherical roller bearing assembly or a tapered roller bearing assembly, so that the focal bearing assembly (222) is a roller bearing assembly.

In the second exemplary embodiment, the axial focal point position (30) is axially offset from the axial single row position (102) so that the axial rotary seal position (32) is offset from the axial single row position (102). In the second exemplary embodiment, the single focal bearing row (100) is also arranged so that the axial focal point position (30) is closer to the lower end of the housing (202) than is the axial single row position (102). As a result, in the second exemplary embodiment, the axial single row position (102), and thus the focal bearing assembly (222), are on the internal side (50) of the housing (202).

In the second exemplary embodiment, the apparatus (200) is further comprised of a lower thrust bearing assembly (70) which is comprised of a single thrust bearing assembly. In the second exemplary embodiment, the thrust bearing assembly (70) is axially located along the housing (202) at an axial thrust bearing position (110) and is configured to provide a thrust bearing function with respect to axial loads in both directions. In the second exemplary embodiment, the axial thrust bearing position (110) is on the internal side (50) of the housing (202).

In the second exemplary embodiment, the thrust bearing assembly (70) is comprised of a pair of thrust bearing tilting surfaces (112) to accommodate the tilting of the shaft (208) within the housing bore (206). In the second exemplary embodiment, the thrust bearing tilting surfaces (112) are comprised of plain bearing surfaces.

In both the first exemplary embodiment and the second exemplary embodiment, the axial rotary seal position (32) is substantially axially coincident with the axial focal point position (30).

In the first exemplary embodiment, in which the focal bearing assembly (222) is a double row focal bearing assembly, the axial rotary seal position (32) and the axial focal point position (30) are also substantially axially coincident with the focal bearing assembly (222). In the first exemplary embodiment, the first thrust bearing assembly (72) and the first focal bearing row (60) are on the internal side (50) of the housing (202), and the second thrust bearing assembly (76) and the second focal bearing row (64) are on the external side (52) of the housing (202). As a result, in the first exemplary embodiment, the first thrust bearing assembly (72) and the first focal bearing row (60) may be lubricated with a lubricating fluid contained within the housing (202), while the second thrust bearing assembly (76) and the second focal bearing row (64) may be lubricated with a fluid, such as a wellbore fluid or a drilling fluid, which is present in the environment in which the apparatus (200) is located.

In the second exemplary embodiment, in which the focal bearing assembly (222) is a single row focal bearing assembly, the axial rotary seal position (32) and the axial focal point position (30) are axially offset from the axial single row position (102) and the focal bearing assembly (222). In the second exemplary embodiment, the thrust bearing assembly (70) and the single focal bearing row (100) are both on the internal side (50) of the housing (202). As a result, in the second exemplary embodiment, the thrust bearing assembly (70) and the single focal bearing row (100) may both be lubricated with a lubricating fluid contained within the housing (202).

A potential advantage of the first exemplary embodiment over the second exemplary embodiment is that the design and configuration of the focal bearing assembly (222) and the thrust bearing assembly (70) in the first exemplary embodiment may be more simple than in the second exemplary embodiment. A potential advantage of the second exemplary embodiment over the second exemplary embodiment is that the design and configuration of the rotary seal assembly (224) in the second exemplary embodiment may be more simple than in the first exemplary embodiment. A further potential advantage of the second exemplary embodiment over the first exemplary embodiment is that the focal bearing assembly (222) and the thrust bearing assembly (70) in the second exemplary embodiment may both be fully located on the internal side (50) of the housing (202) and may therefore potentially be lubricated with a lubricating fluid contained within the internal side (50) of the housing (202).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

I claim:

1. An apparatus for use in drilling a borehole, comprising:
   (a) a housing defining a housing bore;
   (b) a shaft rotatably extending through the housing bore, wherein the shaft is capable of an amount of radial deflection within the housing bore and an amount of tilting within the housing bore about a tilting focal point, and wherein the tilting focal point is axially located along the housing at an axial focal point position;
   (c) a tilting mechanism for accommodating the tilting of the shaft and for providing the tilting focal point, wherein the tilting mechanism is contained within the housing bore and is radially interposed between the housing and the shaft, wherein the tilting mechanism comprises a focal bearing assembly, and wherein the focal bearing assembly is a rolling element bearing assembly comprising one or more rolling element bearings; and
   (d) a rotary seal assembly contained within the housing bore for providing a seal between the housing and the shaft, wherein the rotary seal assembly is axially located along the housing at an axial rotary seal position, and wherein the axial rotary seal position is axially coincident with the axial focal point position.

2. The apparatus as claimed in claim 1 wherein the focal bearing assembly is a double row focal bearing assembly.

3. The apparatus as claimed in claim 2 wherein the double row focal bearing assembly is comprised of a first focal bearing row, wherein the first focal bearing row is axially located along the housing at an axial first row position, wherein the double row focal bearing assembly is comprised of a second focal bearing row, wherein the second focal bearing row is axially located along the housing at an axial second row position, and wherein the axial focal point position is between the axial first row position and the axial second row position so that the axial rotary seal position is between the axial first row position and the axial second row position.

4. The apparatus as claimed in claim 3 wherein the housing has an internal side and an external side, wherein the internal side and the external side are separated by the rotary seal assembly, wherein the axial first row position is on the internal side of the housing, and wherein the axial second row position is on the external side of the housing.

5. The apparatus as claimed in claim 4, further comprising a first thrust bearing assembly contained within the housing bore for supporting the shaft within the housing and transferring axial loads between the housing and the shaft, wherein the first thrust bearing assembly is axially located along the housing at an axial first thrust bearing position, and wherein the axial first thrust bearing position is on the internal side of the housing.

6. The apparatus as claimed in claim 5, further comprising a second thrust bearing assembly for supporting the shaft within the housing and transferring axial loads between the housing and the shaft, wherein the second thrust bearing assembly is axially located along the housing at an axial second thrust bearing position, and wherein the axial second thrust bearing position is on the external side of the housing.

7. The apparatus as claimed in claim 1 wherein the focal bearing assembly is a single row focal bearing assembly.

8. The apparatus as claimed in claim 7 wherein the single row focal bearing assembly is comprised of a single focal bearing row, wherein the single focal bearing row is axially located along the housing at an axial single row position, and wherein the axial focal point position is axially offset from the axial single row position so that the axial rotary seal position is offset from the axial single row position.

9. The apparatus as claimed in claim 8 wherein the housing has an internal side and an external side, wherein the internal side and the external side are separated by the rotary seal assembly, and wherein the axial single row position is on the internal side of the housing.

10. The apparatus as claimed in claim 9, further comprising a thrust bearing assembly contained within the housing bore for supporting the shaft within the housing and transferring axial loads between the housing and the shaft, wherein the thrust bearing assembly is axially located along the housing at an axial thrust bearing position, and wherein the axial thrust bearing position is on the internal side of the housing.

11. The apparatus as claimed in claim 1 wherein the focal bearing assembly is a roller bearing assembly.

12. The apparatus as claimed in claim 11 wherein the roller bearing assembly is selected from the group of roller bearing assemblies consisting of a spherical roller bearing assembly and a tapered roller bearing assembly.

13. The apparatus as claimed in claim 1 wherein the apparatus is a rotary steerable drilling apparatus.

14. The apparatus as claimed in claim 1 wherein the apparatus is a point-the-bit rotary steerable drilling apparatus comprising a deflection mechanism, for causing the radial deflection of the shaft within the housing bore.

15. The apparatus as claimed in claim 14 wherein the rotary seal assembly is a lower rotary seal assembly in the point-the-bit rotary steerable drilling apparatus, wherein the housing has an internal side and an external side, wherein the internal side and the external side are separated by the rotary seal assembly, wherein the deflection mechanism is axially located along the housing at an axial deflection mechanism position, wherein the deflection mechanism is contained within the housing, and wherein the axial deflection mechanism position is on the internal side of the housing.

* * * * *